United States Patent
Unno et al.

(10) Patent No.: US 6,513,985 B2
(45) Date of Patent: Feb. 4, 2003

(54) ROLLER BEARING

(75) Inventors: Tetsuo Unno, Kanagawa (JP); Yoshio Shoda, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/739,965

(22) Filed: Dec. 20, 2000

(65) Prior Publication Data

US 2001/0012420 A1 Aug. 9, 2001

(30) Foreign Application Priority Data

Dec. 20, 1999 (JP) .......................................... 11-361166

(51) Int. Cl.[7] .............................................. F16C 33/34
(52) U.S. Cl. ..................................... 384/568; 384/571
(58) Field of Search ................................ 384/565, 568, 384/569, 571

(56) References Cited

U.S. PATENT DOCUMENTS

| | | | | |
|---|---|---|---|---|
| 3,547,504 A | * | 12/1970 | Bobowicz et al. | |
| 3,689,127 A | * | 9/1972 | Hampp et al. | |
| 4,557,613 A | * | 12/1985 | Tallian et al. | |
| 4,828,404 A | * | 5/1989 | Takata | |
| 4,929,098 A | * | 5/1990 | Takata et al. | |
| 4,978,235 A | * | 12/1990 | Jacob | |
| 5,123,756 A | * | 6/1992 | Amen et al. | |
| 5,441,351 A | * | 8/1995 | Grunze | |
| 5,626,426 A | * | 5/1997 | Honda et al. | |
| 5,630,668 A | * | 5/1997 | Ikezawa et al. | |
| 5,752,775 A | * | 5/1998 | Tsutsui et al. | |
| 6,116,785 A | * | 9/2000 | Kondo et al. | |
| 6,296,395 B1 | * | 10/2001 | Brand et al. | |
| 6,315,458 B1 | * | 11/2001 | Unno et al. | |

FOREIGN PATENT DOCUMENTS

JP          2000-74075         3/2000    ........... F16C/33/58

* cited by examiner

Primary Examiner—Christopher P. Schwartz
Assistant Examiner—Devon Kramer
(74) Attorney, Agent, or Firm—Sughrue Mion, PLLC

(57) ABSTRACT

In the roller bearing, plural of rollers 15 are interposed between an outer raceway 11 of an outer race 12 and an inner raceway 13 of an inner race 14, and a collar portion 16 is formed along one of the axial-direction end portions of the inner raceway 13. The central portion of one of the outer race and inner raceways 11, 14 and the opposing outer peripheral surface of the roller 15 is formed of a first bus with a given radius of curvature. The two end portion sides adjacent to the central portion are formed of a second bus with such a radius of curvature that causes the two end portion sides to part away from the other. The collar surface 19 of the collar portion 16 contacting with an end face of the roller 15 being a convex-shaped spherical surface is formed as a concave-shaped spherical surface.

6 Claims, 5 Drawing Sheets

ROLLER BEARING

BACKGROUND OF THE INVENTION

1. Field of the Invention

The present invention relates to a roller bearing and, in particular, to a roller bearing such as a cylindrical roller bearing and a conical roller bearing which is able to maintain proper lubrication between the end faces of a large number of rollers and the collar portion of the roller bearing.

2. Description of the Related Art

FIG. 5 shows a conventional conical roller bearing 50. This conical roller bearing 50 includes an outer race 52 with an outer raceway 51 formed on the inner peripheral surface thereof, an inner race 54 with an inner raceway 53 formed on the outer peripheral surface thereof, a large number of rollers 55 respectively interposed between the outer and inner raceways 51 and 53, and a collar portion 56 formed so as to extend along the axial-direction end portion of the inner raceway 53.

Each of the outer and inner raceways 51 and 53 is crowning machined to thereby have a bus consisting of a concave-shaped arc line. By the way, in the conical roller bearing 50, differently from a self-aligning roller bearing, the center C1 of the bus of the outer raceway 51 is set at an arbitrary position which is shifted from the axis C of the conical roller bearing 50.

Each of the rollers 55 is structured in the following manner: that is, a rolling surface thereof is formed substantially in a conical shape which includes a convex-shaped arc line as a bus, a large-diameter end face 57 thereof is formed as a convex-shaped spherical surface, and a small-diameter end face 58 thereof is formed so as to have an arbitrary surface shape.

These rollers 55 are respectively arranged in such a manner that their respective rotation axes C2 (about which they can be rotated) extend along the bus of a first virtual conical surface having a vertex C3 at a given position existing along the extension line of the axis C of the conical roller bearing 50.

In the thus structured conical roller bearing 50, escape portions 60, each having a section substantially three quarters (¾) of which are composed of a circle, are successively formed along an entry corner existing between the inner raceway 53 and the collar surface 59 of the collar portion 56.

And, as shown in FIG. 6, in the conical roller bearing 50 that rotates normally, due to a previously given pre-load or a component of a bearing load, the large-diameter end face 57 consisting of a convex-shaped spherical surface is slidingly surface contacted with the collar surface 59 consisting of a conical surface through a contact area A having a given area (see hatching shown in FIG. 6).

By the way, generally, the outer raceway 51, inner raceway 53 and rollers 55 of the conical roller bearing 50 are formed such that their buses are respectively composed of arc lines; and, therefore, in case where an excessive load, a biased load, or sudden acceleration is applied to the conical roller bearing 50, a strange phenomenon called a skew or a tilt is easy to occur in the conical roller bearing 50.

Here, the "skew" means a phenomenon in which the rotation axis C2 of each roller 55 is inclined or skewed along the spiral direction of the above-mentioned first virtual conical surface. On the other hand, the "tilt" means a phenomenon in which the rotation axis C2 of each roller 55 is inclined or tilted with respect to the bus of the above-mentioned first virtual conical surface as well as in the other inclined directions than the inclined direction of the skew phenomenon.

Now, FIGS. 7A and 7B show two states in which a skew and a tilt occur in the conventional conical roller bearing 50, respectively. That is, as shown in FIG. 7A, in case where a skew occurs in the conical roller bearing 50, since the direction of the large-diameter end face 57 consisting of a three-dimensional curved surface varies with respect to the collar surface 59 consisting of a two-dimensional curved surface, the contact area A is moved to the edge portion side of the large-diameter end face 57 as well as to the outside diameter side of the collar surface 59 (see hatching shown in FIG. 7A).

Then, in the conical roller bearing 50, in case where the skew occurs excessively, there is a possibility that the contact area A can deviate from the outside diameter side of the collar surface 59 and thus the contact area between the large-diameter end face 57 and collar surface 59 can be reduced (see a two-dot chained line shown in FIG. 7A).

In this case, when compared with a case where the conventional conical roller bearing 50 rotates normally, since the contact pressure of the contact area A (that is, pressure per unit area) increases, there is a fear that scoring or seizure can occur in one or both of the large-diameter end face 57 and collar surface 59.

On the other hand, as shown in FIG. 7B, in case where a tilt occurs in the conical roller bearing 50 (see hatching shown in FIG. 7B), similarly to the case in which the skew occurs, the contact area A is moved to the outside diameter side of the collar surface 59.

Therefore, in the conventional conical roller bearing 50, in the case of occurrence of an excessive tilt as well, the contact area A is moved to the outside diameter side of the collar surface 59, thereby raising a fear that scoring or seizure can occur in one or both of the large-diameter end face 57 and collar surface 59.

Also, in the conventional conical roller bearing 50, for a structural reason that the large-diameter end face 57 consisting of a spherical surface is slidingly surface contacted with the collar surface 59 consisting of an arc surface by preload, the contact area A has an upper limit, whereby it is difficult to reduce the contact pressure of the contact area A.

SUMMARY OF THE INVENTION

The present invention aims at eliminating the drawbacks found in the above-mentioned conventional conical roller bearing. Accordingly, it is an object of the invention to provide a roller bearing in which scoring or seizure is hard to occur in rollers and a collar portion respectively forming the components of the roller bearing.

In attaining the above object, according to a first aspect of the invention, there is provided a roller bearing, including: an outer race with a concave-shaped outer raceway formed on the inner peripheral surface thereof; an inner race with a concave-shaped inner raceway formed on the outer peripheral surface thereof; a plurality of substantially cylindrical-shaped rolling elements respectively interposed between the outer raceway and the inner raceway; and, a collar portion formed so as to extend along one of an axial-direction end portion of the outer raceway and an axial-direction end portion of the inner raceway. The outer peripheral surface of each of the rolling elements being formed of a convex-shaped bus, and the end faces of the rolling elements are formed as a convex-shaped spherical surface. The central portion of one of the outer and inner raceways, and the outer peripheral surface of each of the rolling elements is formed of a first bus which has a given radius of curvature and, two end portion sides adjoining the central portion are each formed of a second bus having such a radius of curvature that causes the two end portion sides to part away from the other of the outer and inner raceways, and the outer peripheral surface of each of the rolling elements. The collar surface of the collar portion is formed as a concave-shaped spherical surface.

Also, according to a second aspect of the invention, there is provided a roller bearing, including: an outer race with a convex-shaped outer raceway formed on the inner peripheral surface thereof; an inner race with a convex-shaped inner raceway formed on the outer peripheral surface thereof; a plurality of substantially cylindrical-shaped rolling elements respectively interposed between the outer raceway and the inner raceway; and, a collar portion formed so as to extend along one of an axial-direction end portion of the outer raceway and an axial-direction end portion of the inner raceway. The outer peripheral surface of each of the rolling elements is formed of a concave-shaped bus, and the end faces of the rolling elements are formed as a convex-shaped spherical surface. The central portion of one of the outer and inner raceways, and the outer peripheral surface of each of the rolling elements is formed of a first bus which has a given radius of curvature and, two end portion sides adjoining the central portion are each formed of a second bus having such a radius of curvature that causes the two end portion sides to part away from the other of the outer and inner raceways, and the outer peripheral surface of each of the rolling elements. The collar surface of the collar portion is formed as a concave-shaped spherical surface.

Here, the present invention can be applied to, for example, a radial roller bearing such as a cylindrical roller bearing and a conical roller bearing, or a thrust roller bearing, while the shape of the rolling elements and the number of rows of the rolling elements can be selected arbitrarily.

By the way, referring further to the arrangement of the first and second buses which are used to form the outer and inner raceways and rolling elements, in order to control an increase in the contact pressure in the mutual boundary area, the first and second buses may be structured such that they can share a tangent in common, or there may be provided a third bus in such a manner that it bridges over the boundary line between the first and second buses.

In the conventional roller bearing, since the end face of each roller consisting of a convex-shaped spherical surface is theoretically point contacted with the collar surface consisting of a conical surface and also they are surface contacted with each other due to a pre-load or a component of a bearing load, the sliding contact area of a contact area is limited.

On the other hand, in the roller bearing according to the invention, because the collar surface of the collar portion is composed of a concave-shaped spherical surface, for example, in case where the radius of curvature of the collar surface is set so as to correspond to the radius of curvature of the roller end face, the collar surface and the roller end face are surface contacted with each other. Therefore, whether a pre-load or a component of a bearing load is present or not, the sliding contact area of the contact area can be secured by a given amount or more.

And, in the thus structured roller bearing, by applying a pre-load or a component of a bearing load thereto, the sliding contact area of the contact area can be enlarged over the conventional roller bearing, which can reduce the contact pressure of the contact area compared with the conventional roller bearing, and thus, lower the possibility that scoring or seizure can occur in one or both of the roller end face and collar surface.

DETAILED DESCRIPTION OF THE PREFERRED EMBODIMENTS

Now, a description will be given below in detail of an embodiment of a roller bearing according to the invention with reference to the accompanying drawings. By the way, in the embodiment to be described hereinbelow, the same parts thereof as those of the conventional conical roller bearing already described with reference to FIGS. 5 to 7B are given the same designations and thus the description thereof will be simplified or omitted.

Figure 1:
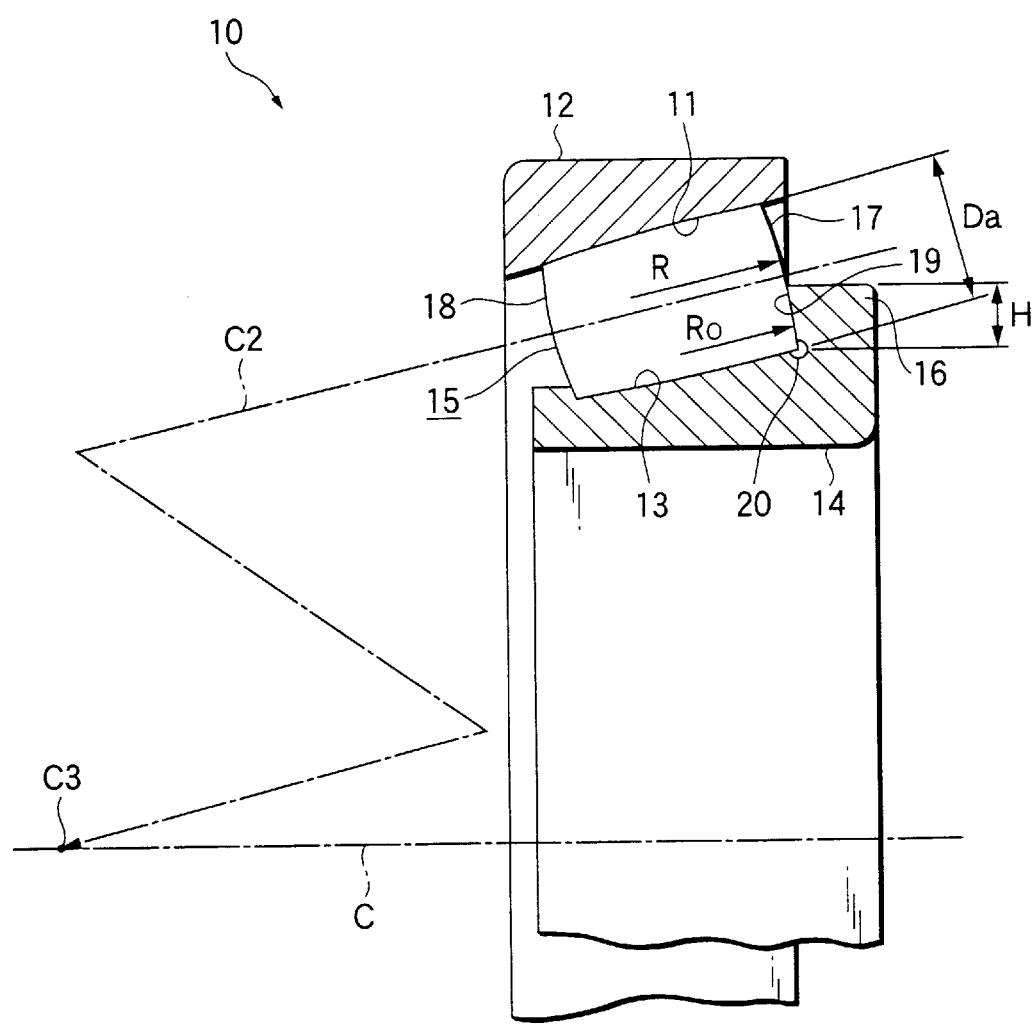
FIG. 1 is a section view of the main portions of an embodiment of a roller bearing according to the invention.

As shown in FIG. 1, a conical roller bearing 10 according to the present embodiment of the invention includes an outer race 12 with an outer raceway 11 formed on the inner peripheral surface thereof, an inner race 14 with an inner raceway 13 formed on the outer peripheral surface thereof, a large number of rollers 15 respectively interposed between the outer and inner raceways 11 and 13, and a collar portion 16 formed so as to extend along the axial-direction end portion of the inner raceway 13.

Each of the outer and inner raceways 11 and 13 is structured in the following manner: that is, the central portion thereof is formed of a first bus having a given radius of curvature; and, each of the two end portion sides thereof respectively adjoining the central portion is crown machined so as to have a crowning which is formed of a second bus having such a radius of curvature that causes the two end portion sides to part away from the outer peripheral surfaces of the rollers 15. And, the outer raceway 11 is formed in such a manner that the center C1 of the bus thereof is set at an arbitrary position which is deviated from the axis C of the conical roller bearing 10. Each of the rollers 15 is formed as a substantially conical-shaped roller whose rolling surface has a bus consisting of a convex-shaped arc line; and, the large-diameter end face 17 of each roller 15 is composed of a convex-shaped spherical surface, whereas the small-diameter end face 18 thereof is formed so as to have an arbitrary surface shape.

Each of the rollers 15 is structured such that the rotation axis C2 thereof is arranged to extend along the bus of a first virtual conical surface whose vertex C3 is set at a given position existing along the extension line of the axis C of the conical roller bearing 10.

The collar portion 16 has a collar surface 19 which can be contacted with the large-diameter end faces 17 of the rollers 15. The collar surface 19 is composed of a concave-shaped spherical surface which is formed along a spherical surface having the above-mentioned vertex C3 as a center thereof. Further, the rising dimension H of the collar surface 19 from the inner raceway 13 is set 40% of the largest diameter dimension Da of the roller 15, that is, the diameter dimension Da of the large-diameter end faces 17 of the roller 15.

On the other hand, the radius of curvature R of the large-diameter end face 17 of the roller 15 is set 90% of the radius of curvature Ro of the collar surface 19.

Figure 2:
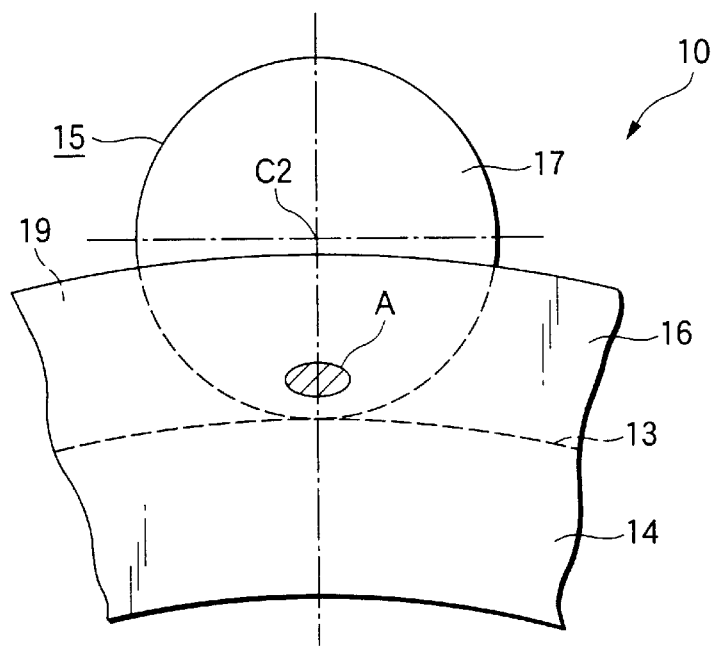
FIG. 2 is a typical view showing the position of a contact area obtained in a conical roller bearing when it rotates normally.

Therefore, as shown in FIG. 2, in the present conical roller bearing 10, theoretically, the large-diameter end faces 17 of the roller 15 is point-contacted with the collar surface 19 and, due to a pre-load or a component of a bearing load, the large-diameter end faces 17 and collar surface 19 are slidingly contacted with each other through a contact area A having a given area.

According to the present conical roller bearing 10, since the collar surface 19 is formed along the spherical surface having the vertex C3 as a center thereof, the sliding contact area of the contact area A can be made relatively large, which can reduce the contact pressure of the contact area A when compared with the conventional conical roller bearing.

That is, according to the above-mentioned conical roller bearing 10, even in case where a skew or a tilt occurs, the contact pressure of the contact area A can be prevented from increasing, thereby being able to reduce a fear that, as in the conventional conical roller bearing, scoring or seizure can occur in one or both of the large-diameter end face 17 and collar surface 19.

Figure 3:
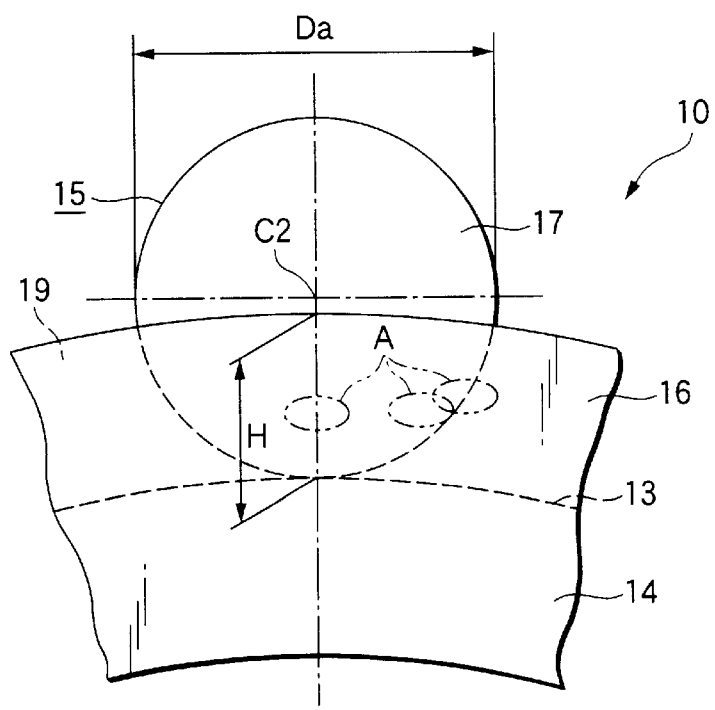
FIG. 3 is a typical view to show the position of a contact area obtained in a conical roller bearing in case where a skew or a tilt occurs therein.

As shown in FIG. 3, according to the above-structured conical roller bearing 10, since the rising dimension H of the collar surface 19 is set 40% of the largest diameter dimension Da of the roller 15, even in case where a skew occurs therein and the contact area A is thereby moved to the outside diameter side of the collar surface 19, the contact area A is prevented from deviating from the collar surface 19 (see a two-dot chained line shown in FIG. 3).

Also, according to the present conical roller bearing 10, even in case where a tilt occurs therein, the contact area A is prevented from deviating from the collar surface 19 (see a three-dot chained line shown in FIG. 3).

Further, according to the present conical roller bearing 10, in case where a skew occurs therein, the moving amount of the contact area A can be reduced when compared with the conventional conical roller bearing. For this reason, the sliding contact speed of the large-diameter end face 17 and collar surface 19 is prevented from increasing, which in turn can prevent the degradation of the lubricating condition of the large-diameter end face 17 and collar surface 19.

By the way, in the present conical roller bearing 10, as the radius of curvature R of the large-diameter end face 17 is made to approach the radius of curvature Ro of the collar surface 19, the sliding contact area of the contact area A increases; but, in case where a skew or a tilt occurs in the conical roller bearing 10, there is increased the possibility that the contact area A can deviate from the collar surface 19. In this case, an edge load is easy to occur in the edge portion of the large-diameter end face 17 of the roller 15.

On the other hand, in the present conical roller bearing 10, in case where the radius of curvature R of the large-diameter end face 17 is set at a given value or less with respect to the radius of curvature Ro of the collar surface 19, the sliding contact area of the contact area A is reduced, whereas the contact pressure of the contact area A is raised.

Figure 4:
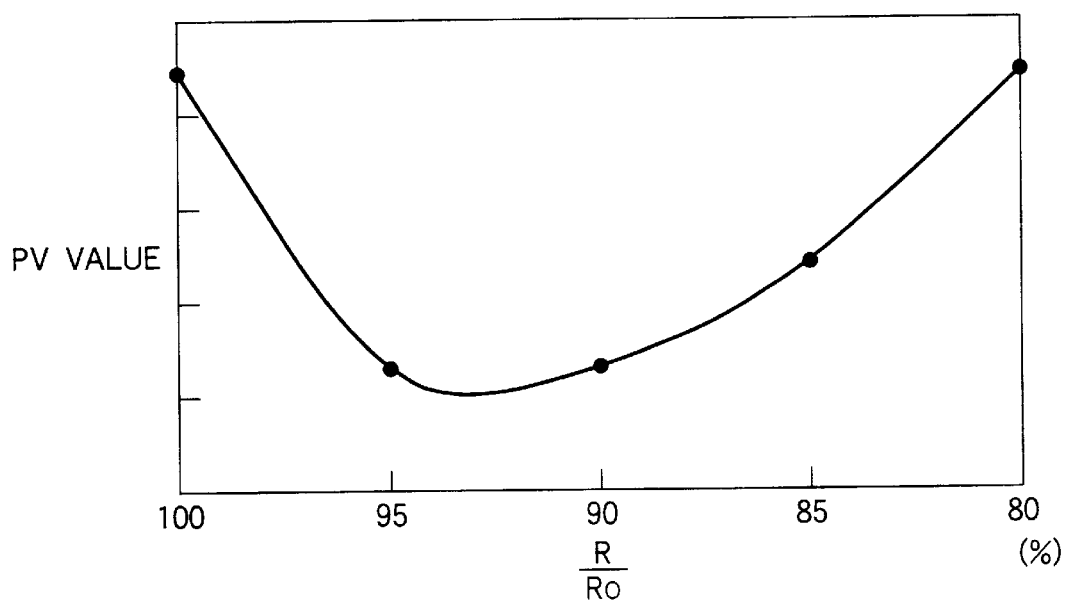
FIG. 4 is a graphical representation to show how a PV value is influenced by the relation between the radius of curvature of the end face of each roller and the radius of curvature of the collar face of a collar portion.
Figure 5:
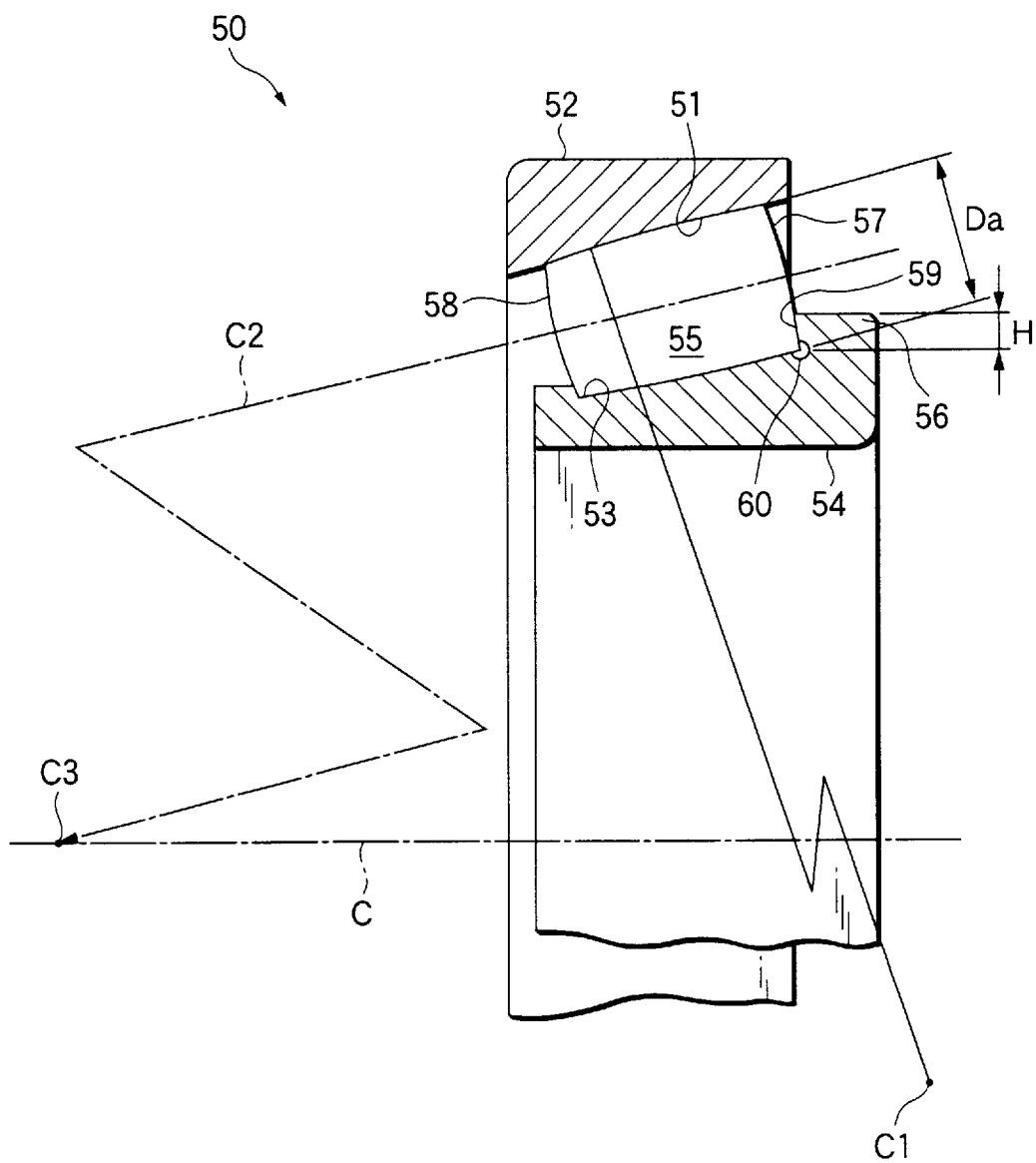
FIG. 5 is a section view of the main portions of a conventional conical roller bearing.
Figure 6:
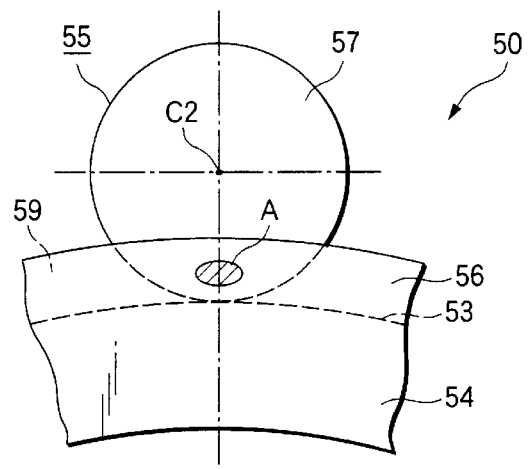
FIG. 6 is a typical view showing the position of a contact area obtained in the conventional conical roller bearing when it rotates normally; and, FIGS. 7A and 7B are typical views showing the position of a contact area obtained in the conical roller bearing in case where a skew or a tilt occurs therein.
Figure 7A:
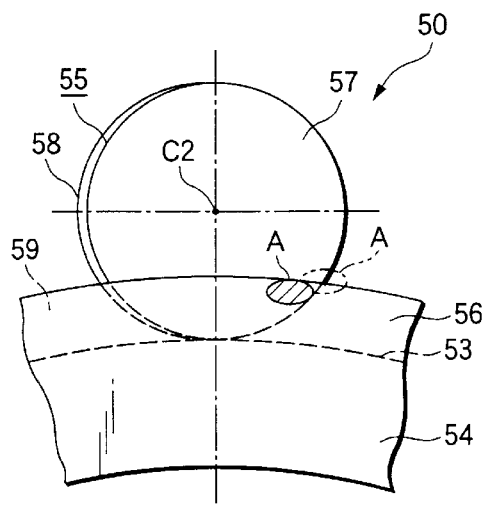
Figure 7B:
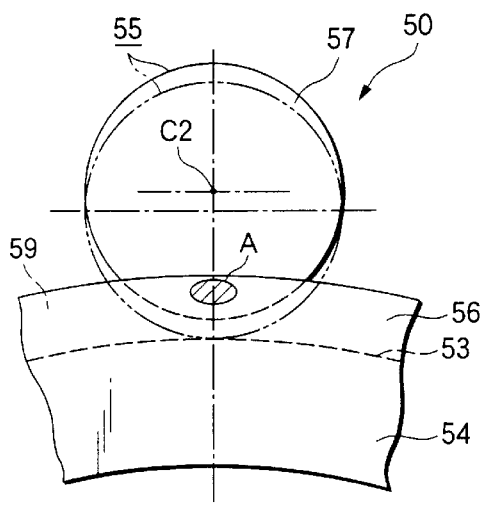

Now, FIG. 4 is a graphical representation which shows how a PV value is influenced by the relation between the radius of curvature R of the large-diameter end face 17 and the radius of curvature Ro of the collar surface 19.

Here, the "PV value" means the product of the contact pressure P of the contact area A and the relative sliding contact speed V of the large-diameter end face 17 and collar surface 19.

According to FIG. 4, it can be seen that, in case where the radius of curvature R is set in the range of 85% to 95% of the radius of curvature Ro, the PV value can be maintained at a given value or less.

And, in case where the radius of curvature R is set in the range of 90% to 95% of the radius of curvature Ro, the PV value can be minimized.

From these facts, the radius of curvature R may be preferably set in the range of 85% to 95% of the radius of curvature Ro; especially, it is preferred that the former may be set 90% or higher of the latter.

By the way, a roller bearing according to the invention is not limited to the above-mentioned embodiment but proper changes and modifications are also possible.

For example, in the above-mentioned embodiment, there is illustrated a collar portion which is formed in the axial-direction end portion of the inner raceway. However, the invention can also apply to a roller bearing in which a collar portion is formed in the axial-direction end portion of an outer raceway.

Further, the invention is not limited to a roller bearing which comprises concave-shaped outer raceway and inner raceway, and rolling elements each formed of a convex-shaped bus, but can also apply to a roller bearing which comprises convex-shaped outer raceway and inner raceway, and rolling elements each formed of a concave-shaped bus.

The invention is especially effective when it is applied to a technology set forth in the specification of the Japanese Patent Application No. 11-174296 filed by the present applicant.

Also, the invention is not limited to a conical roller bearing but it can also apply to a radial roller bearing including a cylindrical roller bearing and a conical roller bearing, and a thrust conical roller bearing; and, according to the invention, the shape of each roller, kinds of crowing machining to be performed on the rolling surface of the roller, and the number of rows of rollers can be selected arbitrarily.

In addition, the invention is not limited to the above-mentioned elements used in the illustrated embodiment: for example, the outer raceway, outer race, inner raceway, inner race, rollers, collar portion, rising dimension, the material, shape, dimension, mode, number and arranging position of the collar surface. But, according to the invention, it is also possible to use other elements arbitrarily, provided that they can attain the object of the invention.

As has been described heretofore, according to the invention, even in case where a skew or a tilt occurs therein, the contact pressure of the contact area between the end faces of the rollers and the collar surface of the collar portion can be reduced.

What is claimed is:

1. A roller bearing, comprising:

an outer race with a concave-shaped outer raceway formed on the inner peripheral surface thereof;

an inner race with a concave-shaped inner raceway formed on the outer-peripheral surface thereof;

a plurality of substantially cylindrical-shaped rolling elements respectively interposed between said outer raceway and said inner raceway; and, a collar portion formed so as to extend along one of an axial-direction end portion of said outer raceway and an axial-direction end portion of said inner raceway, wherein the outer peripheral surface of each of said rolling elements is formed of a convex-shaped bus, and the end faces of said rolling elements are formed as a convex-shaped spherical surface, wherein the central portion of one of said outer and inner raceways, and the outer peripheral surface of each of said rolling elements is formed of a first bus which has a given radius of curvature and, two end portion sides adjoining said central portion are each formed of a second bus having such a radius of curvature that causes the two end portion sides to part away from the other of said outer and inner raceways, and said outer peripheral surface of each of said rolling elements, and wherein the collar surface of said collar portion is formed as a concave-shaped spherical surface.

2. The roller bearing according to claim 1, wherein a radius of curvature of the end face of said rolling element is 85 to 95% of that of the collar surface.

3. The roller bearing according to claim 2, wherein the radius of curvature of the end face of said rolling element is 90 to 95% of that of the collar surface.

4. A roller bearing, comprising:

an outer race with a convex-shaped outer raceway formed on the inner peripheral surface thereof;

an inner race with a convex-shaped inner raceway formed on the outer peripheral surface thereof;

a plurality of substantially cylindrical-shaped rolling elements respectively interposed between said outer raceway and said inner raceway; and, a collar portion formed so as to extend along one of an axial-direction end portion of said outer raceway and an axial-direction end portion of said inner raceway, wherein the outer peripheral surface of each of said rolling elements being formed of a concave-shaped bus, and the end faces of said rolling elements are formed as a convex-shaped spherical surface, wherein the central portion of one of said outer and inner raceways, and the outer peripheral surface of each of said rolling elements is formed of a first bus which has a given radius of curvature and, two end portion sides adjoining said central portion are each formed of a second bus having such a radius of curvature that causes the two end portion sides to part away from the other of said outer and inner raceways, and said outer peripheral surface of each of said rolling elements, and wherein the collar surface of said collar portion is formed as a concave-shaped spherical surface.

5. The roller bearing according to claim 4, wherein a radius of curvature of the end face of said rolling element is 85 to 95% of that of the collar surface.

6. The roller bearing according to claim 5, wherein the radius of curvature of the end face of said rolling element is 90 to 95% of that of the collar surface.

* * * * *